United States Patent [19]

Marquez-Escoto

[11] Patent Number: 5,756,888
[45] Date of Patent: May 26, 1998

[54] COMPRESSION STROKE INDICATOR

[76] Inventor: Jose G. Marquez-Escoto, 2960 11th St., Riverside, Calif. 92507

[21] Appl. No.: 821,046

[22] Filed: Mar. 20, 1997

[51] Int. Cl.[6] ............................................. G01M 15/00
[52] U.S. Cl. ............................ 73/116; 73/47; 73/115; 73/700; 73/744
[58] Field of Search .............................. 73/47, 49.7, 115, 73/116, 119 R, 120, 700, 744

[56] References Cited

U.S. PATENT DOCUMENTS

| | | | |
|---|---|---|---|
| 1,403,685 | 1/1922 | Hammett | 73/47 |
| 1,496,384 | 6/1924 | Seppmann | 73/47 |
| 2,620,656 | 12/1952 | Peterson | 73/47 |
| 2,823,542 | 2/1958 | Walraven et al. | 73/47 |
| 2,862,386 | 12/1958 | Campbell et al. | 73/47 |
| 3,600,941 | 8/1971 | Kammeraad | 73/115 |
| 3,779,081 | 12/1973 | Holtzman | 73/744 |
| 3,943,759 | 3/1976 | Kato et al. | 73/115 |
| 3,979,960 | 9/1976 | Schwartz | 73/744 |
| 4,088,011 | 5/1978 | Bodine et al. | 73/116 |
| 4,292,841 | 10/1981 | Wesley | 73/115 |
| 4,567,395 | 1/1986 | Pundarika | 73/715 |
| 4,667,510 | 5/1987 | Schroeder | 73/117.3 |
| 4,870,587 | 9/1989 | Kumagai | 364/431.07 |

*Primary Examiner*—George M. Dombroske
*Assistant Examiner*—Eric S. McCall

[57] ABSTRACT

A compression stroke indicator including an indication mechanism adapted to signal a user upon the application of pressure thereto. Further provided is an elongated elastomeric hose connected at a first end thereof to the indication mechanism. Also included is at least one hollow hose fittings having a first end connected to a second end of the elastomeric hose. Each hollow hose fitting further has threaded grooves formed in a second end thereof for allowing the screwable coupling of a second end thereof to a spark plug aperture of a combustion engine. Upon a pressure being applied to the hose by the engine, the indication mechanism signals a user.

2 Claims, 3 Drawing Sheets

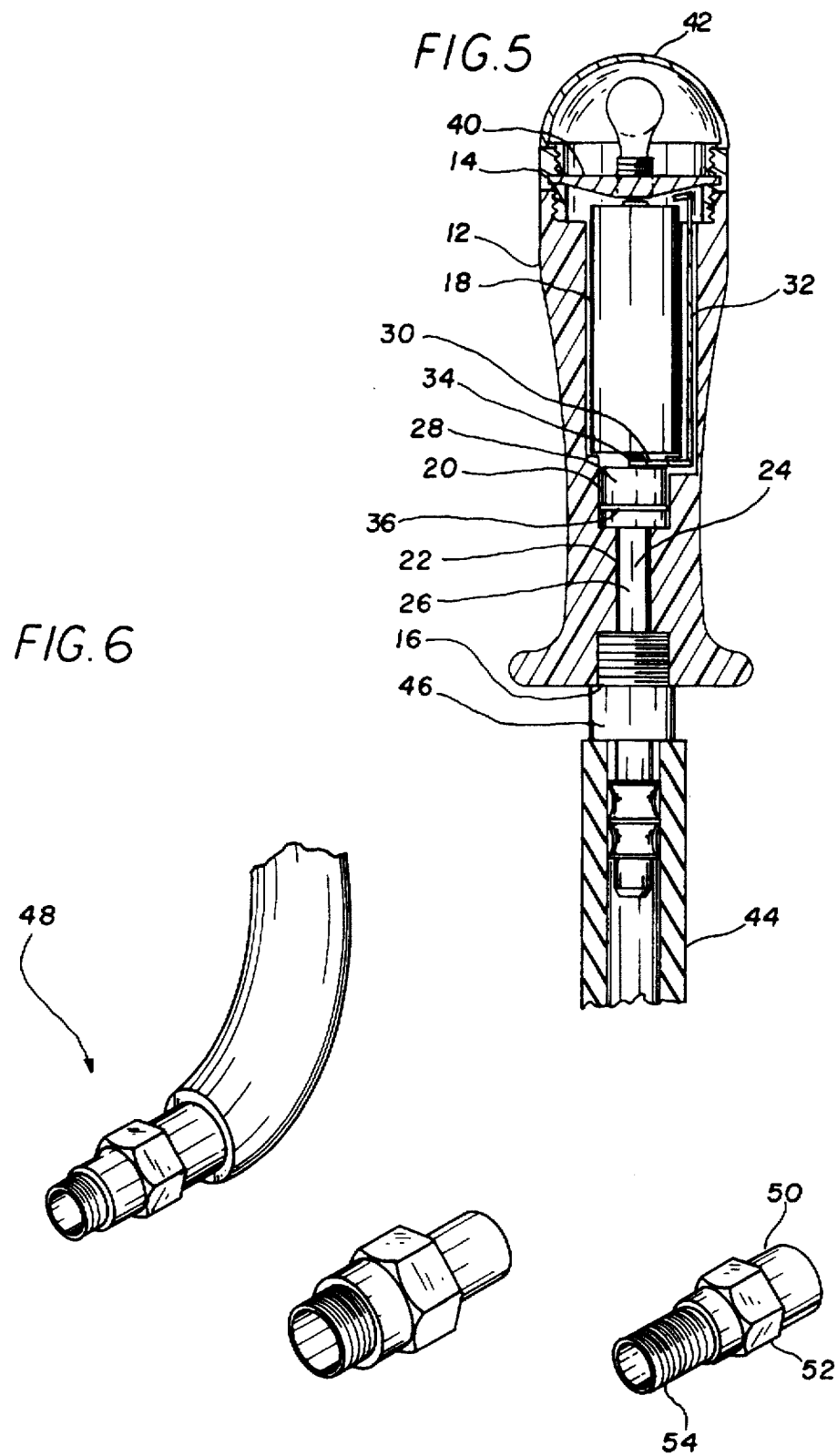

5,756,888

1

COMPRESSION STROKE INDICATOR

BACKGROUND OF THE INVENTION

1. Field of the Invention

The present invention relates to a compression stroke indicator and more particularly pertains to allowing a mechanic to safely and conveniently monitor a compression stroke of a combustion engine.

2. Description of the Prior Art

The use of engine monitoring devices is known in the prior art. More specifically, engine monitoring devices heretofore devised and utilized for the purpose of monitoring various engines are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 4,088,011 to Bodine; U.S. Pat. No. 4,870,587 to Kumagai; U.S. Pat. No. 4,667,510 to Schroeder; U.S. Pat. No. 3,979,960 to Schwartz; U.S. Pat. No. 3,943,759 to Kato et al.; and U.S. Pat. No. 4,567,395 to Pundarika.

In this respect, the compression stroke indicator according to the present invention substantially departs from the conventional concepts and designs of the prior art, and in so doing provides an apparatus primarily developed for the purpose of allowing a mechanic to safely and conveniently monitor a compression stroke of a combustion engine.

Therefore, it can be appreciated that there exists a continuing need for a new and improved compression stroke indicator which can be used for allowing a mechanic to safely and conveniently monitor a compression stroke of a combustion engine. In this regard, the present invention substantially fulfills this need.

SUMMARY OF THE INVENTION

In view of the foregoing disadvantages inherent in the known types of engine monitoring devices now present in the prior art, the present invention provides an improved compression stroke indicator. As such, the general purpose of the present invention, which will be described subsequently in greater detail, is to provide a new and improved compression stroke indicator which has all the advantages of the prior art and none of the disadvantages.

To attain this, the present invention essentially comprises a handle with a generally cylindrical configuration. The handle is equipped with a top opening having a plurality of threaded grooves formed thereabout and a bottom opening also having a plurality of threaded grooves formed. thereabout. As best shown in FIG. 5, the handle further includes a top compartment with a first diameter formed in an upper extent thereof in communication with the top opening. An intermediate compartment is provided with second diameter less than the first diameter. The intermediate compartment is formed in an intermediate extent of the handle in communication with the top compartment. Formed in a lower extent of the handle in communication with the intermediate compartment and the bottom opening is a bottom compartment with a third diameter less than the second diameter. With reference still to FIG. 5, an insulative plunger is included with a lower extent slidably situated within the bottom compartment of the handle and an upper extent integrally coupled to the lower extent and slidably situated within the intermediate compartment. The upper extent of the plunger has a battery contact connected to a top surface thereof. Such

2 battery contact has an L-shaped rod with a first horizontal portion coupled to the top surface of the upper extent of the plunger. The L-shaped rod further has a second vertical portion extending along an inner surface of the top compartment of the handle and terminating adjacent the top opening. The battery contact further includes a spring centrally coupled to the top surface of the upper extent of the plunger in electrical communication with the L-shaped rod. The upper extent of the plunger further has an O-ring situated about the outer periphery thereof. As such, a seal is afforded between the bottom compartment and the top compartment of the handle. As best shown in FIGS. 4 & 5, a light bulb assembly includes a mounting disk formed of a conductive material. A threaded bore is centrally formed therein for allowing a bulb to be threadedly secured therein. Upon such securement, a first contact of the bulb protrudes below a bottom surface of the mounting disk and a second contact of the bulb is in electrical communication with the mounting disk. See FIG. 5. The mounting disk further has a plurality of threaded grooves formed in an outer periphery thereof for allowing screwable coupling with the threaded grooves of the top opening. Upon a cylindrical battery being situated within the top compartment of the handle such that the first contact of the bulb is electrical communication with the battery, the spring of the battery contact has a first unbiased orientation upon a lack of pressure being applied to the plunger. In such orientation, the L-shaped rod and the mounting disk prevent the illumination of the bulb. The spring further has a second biased orientation upon pressure being applied to the plunger for affording contact between the L-shaped rod and the mounting disk thereby allowing illumination of the bulb. Further provided is a transparent light bulb cover having a semi-spherical configuration. A bottom edge of the cover has a plurality of threaded grooves formed therein for securing to the mounting disk about the light bulb thereby affording protection therefor. For providing communication between a combustion engine and the handle, an elongated elastomeric hose is included. The hose is connected at a first end thereof to the bottom opening of the handle via a primary hollow hose fitting which is screwably coupled to the threaded grooves of the bottom opening. A plurality of secondary hollow hose fittings are included each having a first end with a first smooth surface for allowing the removable insertion thereof into a second end of the hose. Each secondary hollow hose fitting further has a central portion having a hexagonal cross-section. Finally, a second end of each secondary hollow hose fitting has threaded grooves formed therein. For allowing the screwable coupling of the second end of the secondary hose fittings to a spark plug aperture of various combustion engines, the second end of the secondary hose fittings have varied diameters.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved compression stroke indicator which has all the advantages of the prior art engine monitoring devices and none of the disadvantages.

It is another object of the present invention to provide a new and improved compression stroke indicator which may be easily and efficiently manufactured and marketed.

It is a further object of the present invention to provide a new and improved compression stroke indicator which is of a durable and reliable construction.

An even further object of the present invention is to provide a new and improved compression stroke indicator which is susceptible of a low cost of manufacture with regard to both materials and labor, and which accordingly is then susceptible of low prices of sale to the consuming public, thereby making such compression stroke indicator economically available to the buying public.

Still yet another object of the present invention is to provide a new and improved compression stroke indicator which provides in the apparatuses and methods of the prior art some of the advantages thereof, while simultaneously overcoming some of the disadvantages normally associated therewith.

Still another object of the present invention is to conveniently and safely monitor a compression stroke of a combustion engine.

Lastly, it is an object of the present invention to provide a new and improved compression stroke indicator including an indication mechanism adapted to signal a user upon the application of pressure thereto. Further provided is an elongated elastomeric hose connected at a first end thereof to the indication mechanism. Also included is at least one hollow hose fittings having a first end connected to a second end of the elastomeric hose. Each hollow hose fitting further has threaded grooves formed in a second end thereof for allowing the screwable coupling of a second end thereof to a spark plug aperture of a combustion engine. Upon a pressure being applied to the hose by the engine, the indication mechanism signals a user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a cross-sectional view of the handle of the present invention.

FIG. 6 is a perspective illustration of the various secondary hollow hose fittings of the present invention.

Similar reference characters refer to similar parts throughout the several views of the drawings.

DESCRIPTION OF THE PREFERRED EMBODIMENT

Figure 1:
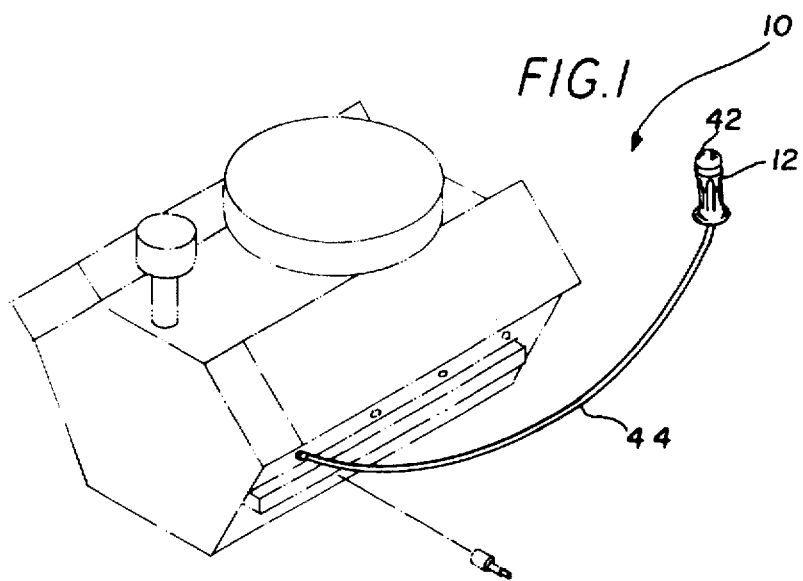
FIG. 1 is a perspective illustration of the preferred embodiment of the compression stroke indicator constructed in accordance with the principles of the present invention.
Figure 2:
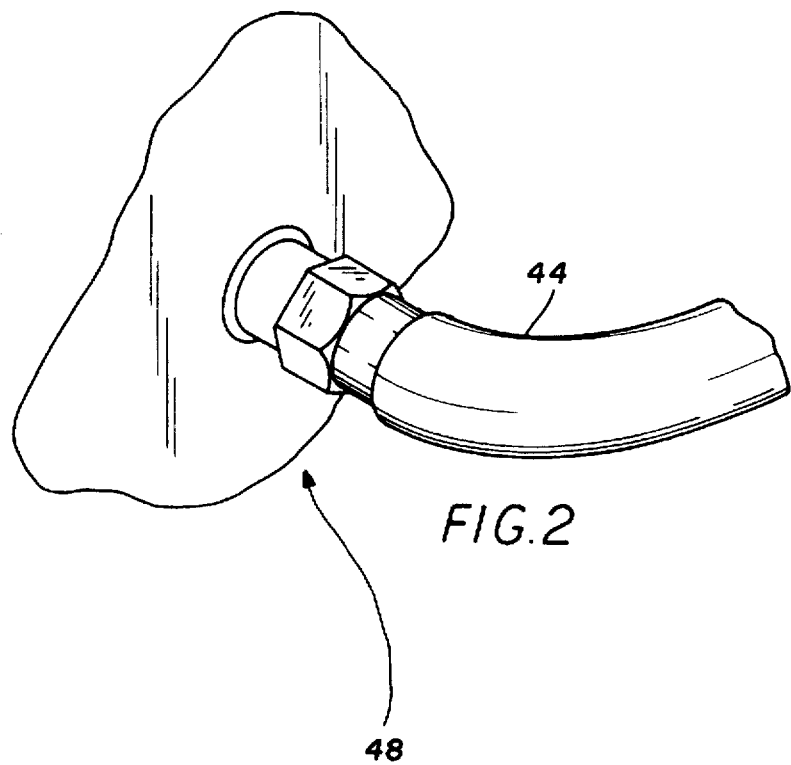
FIG. 2 is a close-up view of the interconnection between one of the secondary hose fittings with combustion engine.
Figure 3:
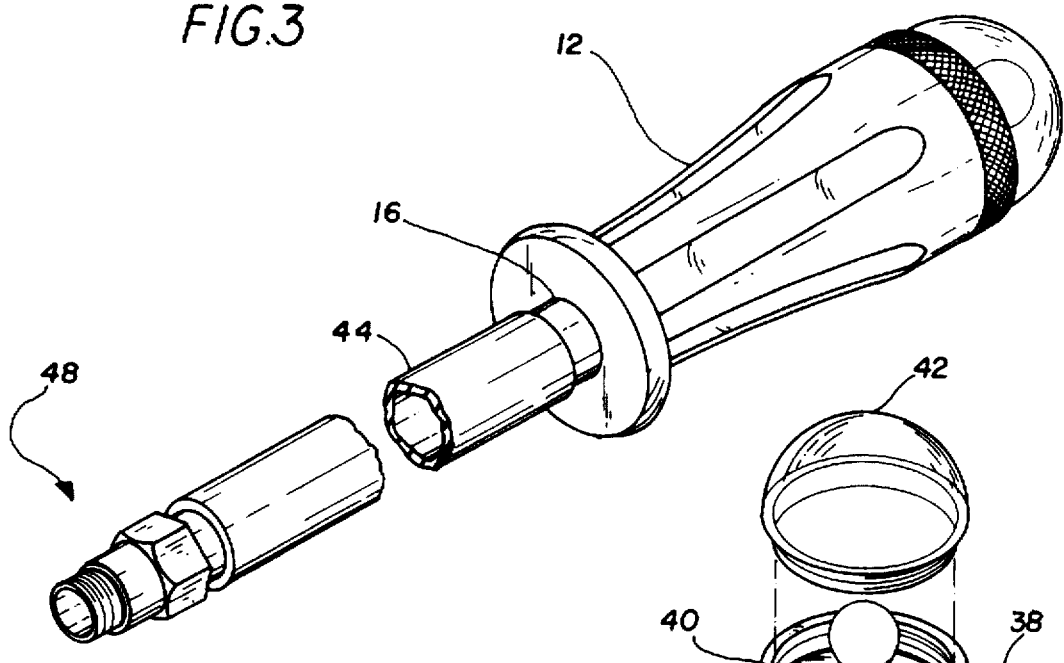
FIG. 3 is a perspective view of the present invention.

With reference now to the drawings, and in particular to FIG. 1 thereof, a new and improved compression stroke indicator embodying the principles and concepts of the present invention and generally designated by the reference numeral 10 will be described.

The present invention, the new and improved compression stroke indicator, is comprised of a plurality of components. Such components in their broadest context include a handle, a hose and a plurality of hose fittings. Such components are individually configured and correlated with respect to each other so as to attain the desired objective.

More specifically, it will be noted that the system 10 of the present invention includes a plastic handle 12 with a generally cylindrical configuration. The handle is equipped with a top opening 14 having a plurality of threaded grooves formed thereabout and a bottom opening 16 also having a plurality of threaded grooves formed thereabout. As best shown in FIG. 5, the handle further includes a top compartment 18 with a first diameter formed in an upper extent thereof in communication with the top opening. An intermediate compartment 20 is provided with second diameter less than the first diameter. The intermediate compartment is formed in an intermediate extent of the handle in communication with the top compartment. Formed in a lower extent 22 of the handle in communication with the intermediate compartment and the bottom opening is a bottom compartment with a third diameter less than the second diameter. Ideally, the handle has a flange formed on a bottom end thereof and a plurality of grooves are formed in the outer surface thereof for facilitating gripping.

With reference still to FIG. 5, an insulative plunger 24 is included with a lower extent 26 slidably situated within the bottom compartment of the handle and an upper extent 28 integrally coupled to the lower extent and slidably situated within the intermediate compartment. The upper extent of the plunger has a battery contact 30 connected to a top surface thereof. Such battery contact has an L-shaped rod 32 with a first horizontal portion coupled to the top surface of the upper extent of the plunger. The L-shaped rod further has a second vertical portion extending along an inner surface of the top compartment of the handle and terminating adjacent the top opening. The battery contact further includes a spring 34 centrally coupled to the top surface of the upper extent of the plunger in electrical communication with the L-shaped rod. The upper extent of the plunger further has an O-ring 36 situated about the outer periphery thereof. As such, a seal is afforded between the bottom compartment and the top compartment of the handle.

Figure 4:
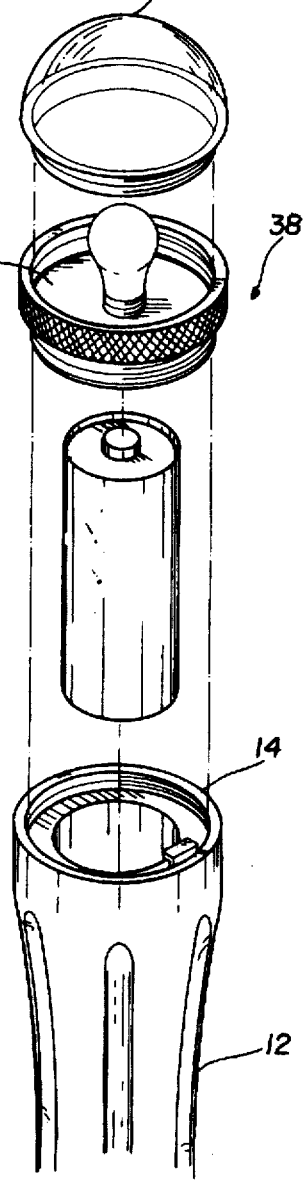
FIG. 4 is an exploded view of the handle, light bulb mounting disk and light bulb cover.

As best shown in FIGS. 4 & 5, a light bulb assembly 38 includes a mounting disk 40 formed of a conductive material. A threaded bore is centrally formed therein for allowing a bulb to be threadedly secured therein. Upon such securement, a first contact of the bulb protrudes below a bottom surface of the mounting disk and a second contact of the bulb is in electrical communication with the mounting disk. See FIG. 5. The mounting disk further has a plurality of threaded grooves formed in an outer periphery thereof for allowing screwable coupling with the threaded grooves of the top opening. Preferably, as shown in FIG. 5, the mounting disk has an upper outer periphery with a gripping surface formed therein, an upper inner circumference with threaded grooves formed therein, and a lower outer periphery with threaded grooves formed therein. In use, a cylindrical battery may be situated within the top compartment of the handle such that the first contact of the bulb is electrical communication with the battery. This is accomplished by screwably engaging the threaded grooves of the lower outer periphery of the mounting disk and those of the handle. By this structure, the spring of the battery contact has a first unbiased orientation upon a lack of pressure being applied to the plunger. In such orientation, the L-shaped rod and the mounting disk are separated thereby preventing the illumination of the bulb. The spring further has a second biased orientation upon pressure being applied to the plunger for affording contact between the L-shaped rod and the mounting disk thus allowing illumination of the bulb.

Further provided is a transparent light bulb cover 42 having a semi-spherical configuration. A bottom edge of the cover has a plurality of threaded grooves formed therein for securing to the threaded grooves of the inner circumference of the mounting disk about the light bulb thereby affording protection therefor.

For providing communication between a combustion engine and the handle, an elongated elastomeric hose 44 is included. The hose is connected at a first end thereof to the bottom opening of the handle via a primary hollow hose fitting 46 which is screwably coupled to the threaded grooves of the bottom opening.

A plurality of secondary hollow hose fittings 48 are included each having a first end 50 with a first smooth surface for allowing the removable insertion thereof into a second end of the hose. Each secondary hollow hose fitting further has a central portion having a hexagonal cross-section 52. Finally, a second end 54 of each secondary hollow hose fitting has threaded grooves formed therein. For allowing the screwable coupling of the second end of the secondary hose fittings to a spark plug aperture of various combustion engines, the second end of the secondary hose fittings have varied diameters. It should be noted that the hexagonal cross-section facilitates the screwable coupling of the secondary hose fittings with the spark plug aperture.

In use, upon the present invention being properly connected to the engine, a pressure applied to the hose by the engine via the spark plug aperture effects the movement of the plunger which, in turn, biases the spring of the battery contact and illuminates the light bulb. As such, the present invention allows a mechanic to safely and conveniently monitor a combustion engine. In the alternative, the light bulb may be substituted with a means of transmitting an audio signal.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved compression stroke indicator comprising, in combination:

a handle with a generally cylindrical configuration with a top opening having a plurality of threaded grooves formed thereabout and a bottom opening having a plurality of threaded grooves formed thereabout, the handle further having a top compartment with a first diameter formed in an upper extent thereof in communication with the top opening, an intermediate compartment with second diameter less than the first diameter formed in an intermediate extent thereof in communication with the top compartment, and a bottom compartment with a third diameter less than the second diameter formed in a lower extent thereof in communication with the intermediate compartment and the bottom opening;

an insulative plunger with a lower extent slidably situated within the bottom compartment of the handle and an upper extent integrally coupled to the lower extent and slidably situated within the intermediate compartment, the upper extent having a battery contact connected to a top surface thereof, the battery contact including an L-shaped rod with a first horizontal portion coupled to the top surface of the upper extent of the plunger and a second vertical portion extending along an inner surface of the top compartment of the handle and terminating adjacent the top opening, the battery contact further including a spring centrally coupled to the top surface of the upper extent of the plunger in electrical communication with the L-shaped rod, the upper extent of the plunger further having an O-ring situated about the outer periphery thereof so as to afford a seal between the bottom compartment and the top compartment of the handle;

a light bulb assembly including a mounting disk formed of a conductive material with a threaded bore centrally formed therein for allowing a bulb to be threadedly secured therein such that a first contact of the bulb protrudes below a bottom surface thereof and a second contract of the bulb is in electrical communication with the mounting disk, the mounting disk further having a plurality of threaded grooves formed in an outer periphery thereof for allowing screwable coupling with the threaded grooves of the top opening, whereby upon a cylindrical battery being situated within the top compartment of the handle such that the first contact of the bulb is electrical communication with the battery, the spring of the battery contact has a first unbiased orientation upon a lack of pressure being applied to the plunger for precluding contact between the L-shaped rod and the mounting disk thereby preventing illumination of the bulb, the spring further having a second biased orientation upon pressure being applied to the plunger for affording contact between the L-shaped rod and the mounting disk thereby allowing illumination of the bulb;

a transparent light bulb cover having a semi-spherical configuration with a bottom edge having a plurality of threaded grooves formed therein for securing to the mounting disk about the light bulb thereby affording protection therefor;

an elongated elastomeric hose connected at a first end thereof to the bottom opening of the handle via a primary hollow hose fitting which is screwably coupled to the threaded grooves of the bottom opening; and a plurality of secondary hollow hose fittings each having a first end with a first smooth surface for allowing the removable insertion thereof into a second end of the hose, each secondary hollow hose fitting further having a central portion having a hexagonal cross-section, and a second end having threaded grooves formed therein, whereby the second end of the secondary hose fittings have varied diameters for allowing the screwable coupling of the second end thereof to a spark plug aperture of various combustion engines;

whereby upon a pressure being applied to the hose by the engine, the plunger is moved thereby biasing the spring of the battery contact and illuminating the light bulb.

2. A compression stroke indicator comprising:

an indication means adapted to signal a user upon the application of pressure thereto, the indication means including a housing with a battery mounted therein and a light coupled thereto;

an elongated elastomeric hose connected at a first end thereof to the indication means;

at least one hollow hose fittings each having a first end connected to a second end of the elastomeric hose, each hollow hose adapted for allowing a coupling of a second end thereof to a spark plug aperture of a combustion engine; and plunger means for connecting the light and the battery upon the receipt of pressure from the spark plug aperture;

whereby upon the pressure being applied to the hose by the engine, the light of the indication means signals a user.

* * * * *